Figure 1:
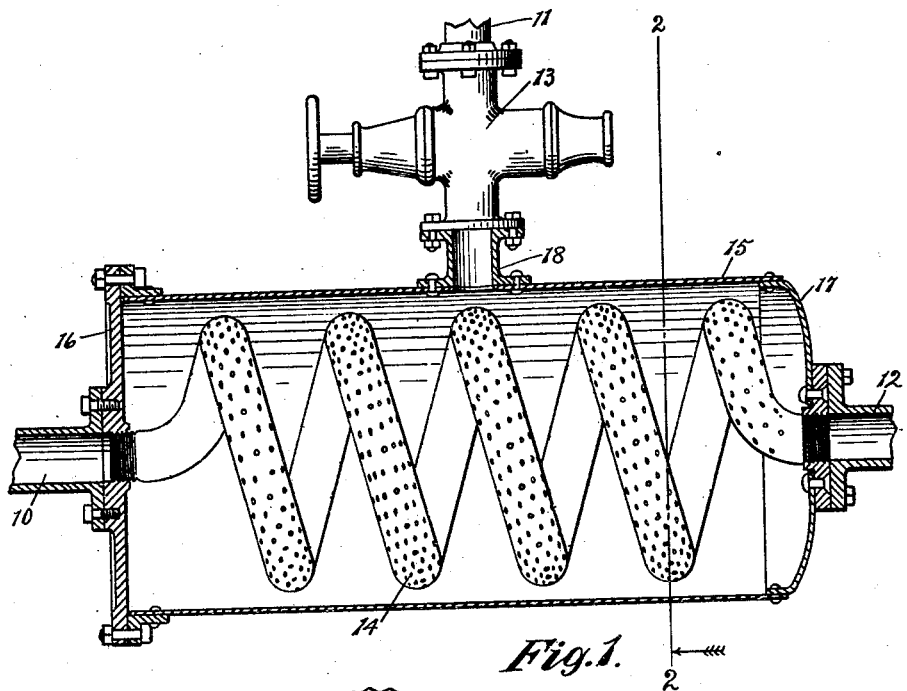

Aug. 18, 1931.                    W. A. GILCHRIST                    1,819,286
                              STEAM SUPPLY APPARATUS
                              Original Filed April 17, 1922

Inventor:
William A. Gilchrist
By Chas. J. Wilson
Attys.

Patented Aug. 18, 1931

1,819,286

UNITED STATES PATENT OFFICE

WILLIAM A. GILCHRIST, OF CHICAGO, ILLINOIS

STEAM SUPPLY APPARATUS

Continuation of application Serial No. 554,323, filed April 17, 1922. This application filed July 7, 1928.
Serial No. 290,920½.

This invention is a continuation of that disclosed in the co-pending application of William A. Gilchrist, Serial No. 554,323, filed April 17, 1922, for steam supply apparatus, and relates in general to an apparatus for mixing a flow of gas or vapor with a supplementary flow for providing a continuous supply at substantially uniform temperature and pressure, and more particularly to an apparatus for continuously supplying steam for use in the evaporating pans of sugar making apparatus where a constant supply of steam at substantially uniform temperature and pressure is required.

In sugar plants for purposes of economy, it is highly desirable to use exhaust steam from the engine steam pumps, etc., around the plant, but the supply of such exhaust steam is more or less intermittent, whereas a continuous supply is required at the evaporating pans, and furthermore, the exhaust steam being close to the saturation point condenses so rapidly that it is not satisfactory for the desired purposes. On the other hand, dry or superheated steam alone is inadequate for the evaporation pan requirements for the reason that dry steam does not give out its heat units as readily as a moist steam. The most efficient results are secured by the use of a hot, moderately moist steam, such as can be obtained by a thorough mixture of saturated exhaust steam and superheated steam, but unless this mixture be exceedingly intimate and thorough, laning and stratification of the two steams occurs and separation to a considerable degree which results in a collection of dry steam in the tops of the pan jackets where it becomes pocketed and gives up its heat very slowly, greatly reducing the efficiency of the pans.

The primary object of this invention is to utilize the available exhaust steam, heat the same so as to revaporize the condensates and heavier particles thereof, and intimately and thoroughly mix this heated exhaust steam with superheated steam so that the resultant mixture is a hot, moist steam, thoroughly mixed without laning or stratification, and most suitably adapted for use in the evaporating pans.

Another object of this invention is to supplement the flow of steam from a source that may supply only a variable and intermittent supply to thereby provide a continuous and uniform flow at substantially uniform temperature and pressure.

A further object of this invention is to provide an improved method and means for setting up the desired turbulence in one of two fluids desired to be mixed whereby the relatively heavy particles of said fluid are moved relatively closer to the other fluid than the lighter particles thus assuring thorough mixing without laning.

Figure 2:
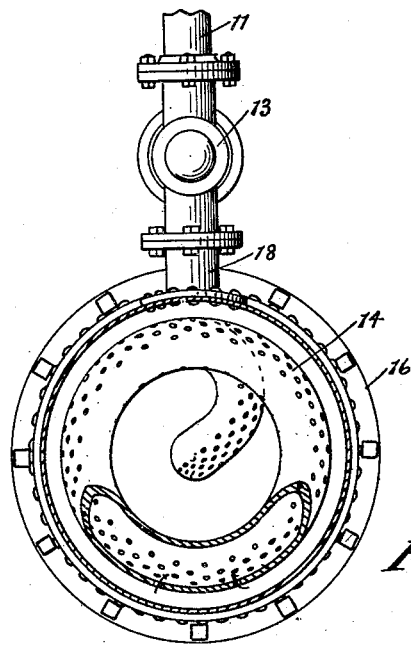

Other and further objects of this invention will be apparent as the same becomes better understood from an examination of the specifications and claims in connection with the accompanying drawings, wherein Fig. 1 is a central longitudinal sectional view illustrating one form of apparatus embodying the invention, some parts being shown in elevation, and Fig. 2 is a transverse sectional view taken on the line 2—2 of Fig. 1.

In order to heat the exhaust steam and revaporize the condensates and heavier particles thereof and at the same time admix therewith the requisite quantity of heated steam, I have as the result of considerable experimentation, devised the present very simple apparatus and method which in use has proven durable, economical and highly efficient.

This apparatus, as will be apparent from an inspection of the drawings, has a helical coil through which the exhaust steam is caused to flow under pressure, the coil being surrounded by a jacket in which a supply of superheated steam is constantly maintained under a pressure in excess of the exhaust steam pressure by an automatic pressure regulating valve of any preferred form, such as can be purchased on the market.

The exhaust steam traveling through the conduit which is coiled into helical formation, is given a whirling action, that is, it travels in a tortuous or helical path, so that it is subjected to the action of centrifugal force which causes the heavier particles of moisture and condensates to travel toward and impinge against the outer circumferential walls of the coil. If the saturated steam were traveling through a straight conduit or tube, the heavier particles would not come in contact with the walls of the tube to any great extent, as they would be carried along in the most rapidly traveling portion of the stream, which of course would be the center of the stream, in a path the farthest possible remote from the surrounding walls of the tube. These moisture particles, therefore, would not become re-evaporated, but would continue as condensates into the jackets of the evaporated pans where they would immediately drop into the traps without performing any evaporated effect or useful work whatsoever. In my construction, however, the heavier particles are thrown by centrifugal force against the outer walls of the coil and these walls, being highly heated by the surrounding superheated steam, cause the re-evaporation of these liquid particles so that they continue into the evaporating pans in the form of vapor which gives up its heat units for utilization by the pans before again becoming condensed.

In addition to the re-evaporation of the heavier liquid particles caused by their impingement against the hot outer walls of the coil, the evaporation of the liquid particles is further induced by the projection of small streams of superheated steam radially into the coil. The entrance of this steam is counter to the radially outward direction of travel of the heavier particles under the influence of centrifugal force, so that these outwardly traveling particles which collide, so to speak, with the inwardly moving jets of superheated steam, are evaporated thereby. It is manifest, therefore, that the application of centrifugal force to the saturated exhaust steam produces practically complete re-evaporation of the condensates and liquid particles, partially by impingement of these particles against the highly heated walls of the conduit, and partially by direct contact with or collision of the outwardly moving particles with the inwardly directed jets of superheated steam. In this manner, not only the condensates and heavier particles of the saturated exhaust steam are re-evaporated, but the superheated steam is directly, intimately and thoroughly admixed with the exhaust steam so that the resultant mixture is a complete diffusion of the exhaust and superheated steams of substantially uniform temperature and humidity, and in which the super-heated and saturated steams are so thoroughly intermixed and diffused that laning or stratification is entirely obviated and the entire resultant product is available for efficient utilization in the evaporating pans.

Separate steam supply pipes are indicated at 10 and 11, respectively. A pipe through which a continuous uniform supply of steam is to be furnished, is indicated at 12. In event steam furnished through the pipe 12 is to be employed in the evaporating pans of a sugar mill, or the like, exhaust steam from the power plant may be supplied through the pipe 10 while superheated steam directly from the boiler (not shown) will be supplied through the pipe 11. The invention contemplates that a maximum use of the exhaust steam furnished through the pipe 10 will be made while still maintaining a constant supply of steam through the pipe 12 at uniform temperature and pressure.

A reducing valve 13, of any well known form of construction, applied to the pipe 11, serves to determine the pressure at which steam is to be furnished through the pipe 12. This reducing valve also automatically serves to limit the admission of steam from the pipe 11 to that required to maintain the desired pressure and temperature of steam in the pipe 12. As shown, pipes 10 and 12 are directly connected by a perforated pipe 14, preferably wound into a helix. The perforated pipe 14 is, in turn, surrounded by a drum 15, the ends 16 and 17 of which serve as couplings for connecting the ends of the pipe 14 with the pipes 10 and 12 respectively. Steam from pipe 11 is admitted to the chamber of the drum 15 about the contained pipe 14. For this purpose the drum 15 is shown as being formed with a lateral flanged opening 18 and the reducing valve 13 is employed as a coupling for uniting the pipe 11 with the flange of this opening.

It follows that at all times except when the exhaust steam is furnished through pipe 10 at sufficient pressure to satisfy the requirements of pipe 12, steam from pipe 11 admitted to the drum 15 through the reducing valve 13 will not only supplement the steam supplied through pipe 10 by entering the openings of the perforated pipe 14, but, by surrounding the coils of pipe 14 will transmit heat to the steam passing through the same and insure the evaporation of the moisture which may be contained therein. Furthermore, the arrangement of the perforated pipe 14 in coils with the perforations in the outer surface of the coils insures that an intimate mixture of the steam entering the pipe through its openings with the steam flowing through the pipe, will be obtained.

As the proportion of superheated steam admitted through pipe 11 will vary inversely with variations in the amount of exhaust steam furnished through pipe 10, apparatus for controlling the temperature of the steam delivered through pipe 12 may be desirably associated with the apparatus forming the subject of this application in some cases. The apparatus shown in my application for patent on method and apparatus for controlling steam temperature, Serial No. 554,324, filed April 17, 1922, may be employed for this purpose if desired.

Although steam is the fluid referred to herein for convenience, it will be understood that the apparatus may be used with other vapors.

It will be apparent that by reason of the whirling motion given to the exhaust steam passing through the pipe 14 the relatively heavy particles of this steam will move relatively to the lighter particles thereof by centrifugal force into relatively closer proximity to the walls of said pipe and the superheated steam admitted through the perforations thereof, thus assuring thorough mixing by causing relatively closer contact of the heavier particles of the exhaust steam with the superheated steam to thereby prevent laning.

I am aware that many changes may be made without departing from the principles of this invention, and I therefore do not wish to be limited to the details shown or described.

I claim:

1. In combination, a helical coil of pipe having a plurality of complete turns, the outer circumferential walls thereof being perforated substantially as described, a feed pipe applied to the delivery end of the pipe coil, a supply pipe for exhaust steam applied to the receiving end of the pipe coil, a jacket surrounding the pipe coil, a supply pipe for superheated steam entering the jacket and a pressure reducing valve controlling the last mentioned supply pipe.

2. Uniting superheated steam and exhaust steam from separate sources by adding the superheated steam to the exhaust steam while the latter is in rapid whirling motion and conveying the mixed fluids through a common feed pipe.

3. The method of producing a vapor of a desirable temperature and humidity which consists in heating the walls of a conduit, supplying saturated vapor under pressure to said conduit, causing the heavier particles of said vapor to travel through said conduit principally in contact with one wall of said conduit, introducing superheated vapor under a pressure greater than the saturated vapor into the conduit in opposition to the direction of travel of said heavier particles and delivering the resultant vapor from the conduit.

4. In a vapor supplying apparatus, the combination of a conduit provided with perforations, means for supplying saturated steam thereto, and means for regulating and conducting a flow of superheated steam under a pressure in excess of that in said conduit into contact with the perforated portion of said conduit to heat said conduit walls and project jets of said superheated steam into said conduit through said perforations, the conduit being of helical shape to cause the heavier particles of the saturated steam passing therethrough to travel toward said perforated wall portion and counter to the entering jets of superheated steam.

In witness of the foregoing I affix my signature.

WILLIAM A. GILCHRIST.